United States Patent
Lee et al.

(10) Patent No.: US 8,219,093 B2
(45) Date of Patent: Jul. 10, 2012

(54) HANDOVER PROCESSING METHOD AND SYSTEM FOR MULTI-MODE MOBILE STATION

(75) Inventors: Hyun Hye Lee, Suwon-si (KR); Sang Hyun Lee, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 844 days.

(21) Appl. No.: 12/127,180

(22) Filed: May 27, 2008

(65) Prior Publication Data

US 2008/0299974 A1    Dec. 4, 2008

(30) Foreign Application Priority Data

May 29, 2007 (KR) .................. 10-2007-0051886

(51) Int. Cl.
*G06F 15/16* (2006.01)
(52) U.S. Cl. .................. 455/436; 455/552.1
(58) Field of Classification Search .................. 455/436, 455/437, 432.1, 414.1, 552.1; 370/331, 352
See application file for complete search history.

(56) References Cited

U.S. PATENT DOCUMENTS

| | | | |
|---|---|---|---|
| 2005/0101329 A1* | 5/2005 | Gallagher | 455/436 |
| 2007/0004412 A1 | 1/2007 | Henttonen et al. | |
| 2011/0026436 A1* | 2/2011 | Karaoguz et al. | 370/254 |

FOREIGN PATENT DOCUMENTS

| | | |
|---|---|---|
| KR | 2005-61250 | 6/2005 |
| KR | 2005-72443 | 7/2005 |
| KR | 2007-32534 | 3/2007 |

OTHER PUBLICATIONS

3GPP; 3GPP TS 43.318; Global System for Mobile Communications; 3rd Generation Partnership Project; Technical Specification Group GSM/EDGE Radio Access Network; Generic Access to the A/Gb Interface; Stage 2 (Release 6); V6.0.0 (Jan. 2005).

3GPP; 3GPP TS 44.318; Global System for Mobile Communications: 3rd Generation Partnership Project; Technical Specification Group GSM/EDGE Radio Access network Generic Access to the A/Gb Interface; Mobile Generic Access Interface Layer 3 Specification (Release x) Vx1.0 (Jan. 2005).

* cited by examiner

*Primary Examiner* — Sam Bhattacharya
(74) *Attorney, Agent, or Firm* — Cha & Reiter, LLC (57) ABSTRACT

The present invention relates to efficient handover processing for a multi-mode mobile station supporting a licensed wireless system and unlicensed wireless system. A handover processing method using unlicensed mobile access (UMA) includes: checking, upon recognition of necessity of handover, neighbor cell information from a licensed wireless system; determining possibility of handover on the basis of the neighbor cell information; preventing, if handover is not possible, a handover-related operation, and maintaining an existing connection to the licensed wireless system; and performing, if handover is possible, handover to an associated unlicensed wireless system.

11 Claims, 6 Drawing Sheets

| | | |
|---|---|---|
| | CM | 150 |
| | MM | 148 |
| L3 | ACCESS SWITCH | 160 |
| | RR, UNLICENSED  156 | RR, LICENSED  146 |
| | 154  L₂ UNLICENSED | 144  L₂ LICENSED |
| | 152  L₁ UNLICENSED | 142  L₁ LICENSED |

HANDOVER PROCESSING METHOD AND SYSTEM FOR MULTI-MODE MOBILE STATION

CLAIMS OF PRIORITY

This application claims priority to an application entitled "HANDOVER PROCESSING METHOD AND SYSTEM FOR MULTI-MODE MOBILE STATION" filed in the Korean Intellectual Property Office on May 29, 2007 and assigned Serial No. 2007-0051886, the entire contents of which are incorporated herein by reference.

BACKGROUND OF THE INVENTION

1. Field of the Invention

The present invention relates generally to a multi-mode mobile station and, more particularly, to an efficient handover processing method and system for a multi-mode mobile station capable of supporting unlicensed mobile access (UMA) technology.

2. Description of the Related Art

In general, licensed wireless systems (mobile communication system such as Global System for Mobile communications (GSM), Universal Mobile Telecommunication System (UMTS) and Code Division Multiple Access (CDMA)) and an unlicensed wireless system (Wi-Fi or Bluetooth) have been built using separate networks that overlap with each other in some places. An unlicensed wireless system and a licensed wireless system both have their respective advantages and disadvantages. For example, the unlicensed wireless system provides a high speed service at a low cost and supports a narrow service area and low mobility. A licensed wireless system provides a low speed service at a high cost and supports a wide service area and high mobility.

Recently, unlicensed mobile access (UMA) technologies have been developed as a convergence means that combines a licensed wireless system and an unlicensed wireless system together for internetworking. Multi-mode mobile stations capable of connecting to both a licensed wireless system and an unlicensed wireless system also have been developed.

In UMA, a UMA network controller (UNC) can transparently provide a multi-mode mobile station with voice, data, and other services of a mobile communication system through an access point (AP) of an unlicensed wireless system such as a wireless local area network (WLAN) without modification of equipment of the mobile communication system such as a mobile switching center (MSC), serving GPRS support node (SGSN), and home location register (HLR).

UMA enables a mobile subscriber to use the same services as a licensed wireless system but through an unlicensed wireless system, such as Wi-Fi or Bluetooth. In addition. UMA enables a mobile network operator to remove shadow areas and extend service areas at a low cost by installing fixed Internet Protocol (IP) networks and WLAN access points at shadow areas, such as homes. Thus, the mobile network operator may realize a profit by encouraging replacement of wired telephones at home with mobile stations.

UMA is based on specifications created by a consortium of radio infrastructure builders, handset manufacturers, and network operators. UMA enables mobile subscribers to receive seamless voice and data services using their multi-mode mobile stations. UMA supports voice call and data session handover between a licensed wireless system and an unlicensed wireless system, thereby enabling seamless roaming and uninterrupted services.

As described above, compared with a licensed wireless system, an unlicensed wireless system provides services at a higher rate, has a narrower service area, and supports a smaller number of subscribers connectable to a base station. Hence, while a user of a mobile station moves between coverage areas of a licensed wireless system and unlicensed wireless system, an increased number of transitions between the licensed wireless system and unlicensed wireless system can be expected. Accordingly, it would be nice to provide an efficient handover mechanism for a combined communication system of a licensed wireless system and unlicensed wireless system.

SUMMARY OF THE INVENTION

The present invention provides an efficient handover processing method and system in an unlicensed mobile access (UMA) communication system including licensed and unlicensed wireless infrastructures.

In accordance with an embodiment of the present invention, a handover processing method for a multi-mode mobile station supporting UMA includes:

upon recognition of a necessity of a handover, checking a neighbor cell information from a licensed wireless system; determining a possibility of handover on the basis of the neighbor cell information; if handover is not possible—(a) preventing a handover-related operation, and (b) maintaining an existing connection to a licensed wireless system; and if handover is possible, performing a handover to an associated unlicensed wireless system.

In accordance with another embodiment of the present invention, a handover processing method for a multi-mode mobile station supporting UMA includes: receiving a system information message from a serving licensed wireless system; determining whether a current value of a cell indicator of an unlicensed wireless system is changed, wherein the current value of the cell indicator is contained in neighbor cell information of the system information message; if the current value of the cell indicator is not changed, maintaining an existing connection to the licensed wireless system; if the current value of the cell indicator is changed, updating a saved old value of the cell indicator with the current value of the cell indicator; and performing handover on the basis of a current value of the cell indicator.

In accordance with another embodiment of the present invention, a multi-mode mobile station supporting UMA includes a first communication module for communicating with a licensed wireless system; a second communication module for communicating with an unlicensed wireless system; and a common module operably connected to the first and second communication module for examining neighbor cell information received through the first communication module, and handling handover between the licensed wireless system and the unlicensed wireless system through operation control of the first communication module and the second communication module according to the neighbor cell information.

In accordance with another embodiment of the present invention, a handover processing system for a UMA communication network includes: a licensed wireless system for periodically broadcasting a system information message containing neighbor cell information related to an unlicensed wireless system; and a mobile station for performing handover to the unlicensed wireless system according to the neighbor cell information from the licensed wireless system.

BRIEF DESCRIPTION OF THE DRAWINGS

The above features and advantages of the present invention will be more apparent from the following detailed description in conjunction with the accompanying drawings, in which.

DETAILED DESCRIPTION OF THE PRESENT INVENTION

Hereinafter, embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail. Particular terms may be defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes may be made and equivalents may be substituted for elements of the invention.

The present invention relates to a multi-mode mobile station. In particular, an efficient handover processing method, apparatus and method are provided for a multi-mode mobile station supporting heterogeneous communication systems.

The present invention provides an efficient handover processing method and system for a multi-mode mobile station in an unlicensed mobile access (UMA) system including licensed and unlicensed wireless infrastructures.

First, a brief introduction to UMA is provided.

A licensed wireless system provides mobile stations with services using a government-permitted band of radio frequencies. In a licensed wireless system, access to the system using a corresponding radio frequency band is expensive. That is, base station equipment for providing a communication infrastructure using a permitted radio frequency band is very expensive. Base stations are normally installed at regular distances according to a cell plan. A wireless transmission mechanism and transmission frequencies of a wireless system limit the data transmission speed and scope. Service quality (voice quality and data transmission speed) of a licensed wireless system is much lower than that of wired access. A subscriber of the licensed wireless system receives relatively poorer services at a relatively higher cost.

Wired access enables a higher quality voice service and a higher speed data service at a lower cost. In wired access, however, user mobility is limited. Hence, the use of unlicensed wireless systems has rapidly increased to realize mobile access to wired networks. For example, unlicensed wireless systems can support wireless communication based on the IEEE 802.11a, b or g) standard (Wi-Fi) or Bluetooth standard. In general, an unlicensed wireless system includes a base station, which has a wireless access point (AP) having a physical connection (for example, a coaxial or optical cable) to a wired network.

The data transmission rate of the Wi-Fi or Bluetooth standard is much higher than that of a licensed wireless system. An unlicensed wireless system can provide a higher quality service at a lower cost. However, the coverage of an unlicensed wireless system is limited to a preset distance from a base station.

Currently, technologies for integrating a licensed wireless system and unlicensed wireless system together in a non-interrupted manner have been developed. That is, the user of a mobile station can access an unlicensed wireless system when the mobile station is within the range of the unlicensed wireless system, and can also access a licensed wireless system when the mobile station is outside the range of the unlicensed wireless system.

UMA is a next generation wired/wireless convergence technology that supports handover between a wireless mobile communication system and a fixed hot spot such as an IP network. UMA is an access technology that connects a mobile station to a wireless service using an unlicensed frequency band.

A UMA-enabled mobile station can connect to a WLAN hot spot to receive a very high speed data communication service or use Internet telephony (VoIP) service. The UMA-enabled mobile station can use a licensed wireless system (mobile communication system) at locations outside the range of a WLAN. The user of a UMA-enabled mobile station can receive a telephony service without interruption when the user moves into the range of a WLAN.

UMA is a radio technology for accessing wireless services that enables use of an unlicensed frequency band with relatively low antenna power. The use of UMA is rapidly increasing for, for example, voice and data transmission within limited places, and remote control of industrial equipment, cars, and leisure goods. In particular, UMA enables development of a combining mechanism for connecting a mobile communication system such as GSM, General Packet Radio Service (GPRS), and UMTS to a short-range communication technology utilizing an unlicensed frequency band such as Bluetooth or IEEE 802. 11.

Figure 1A:
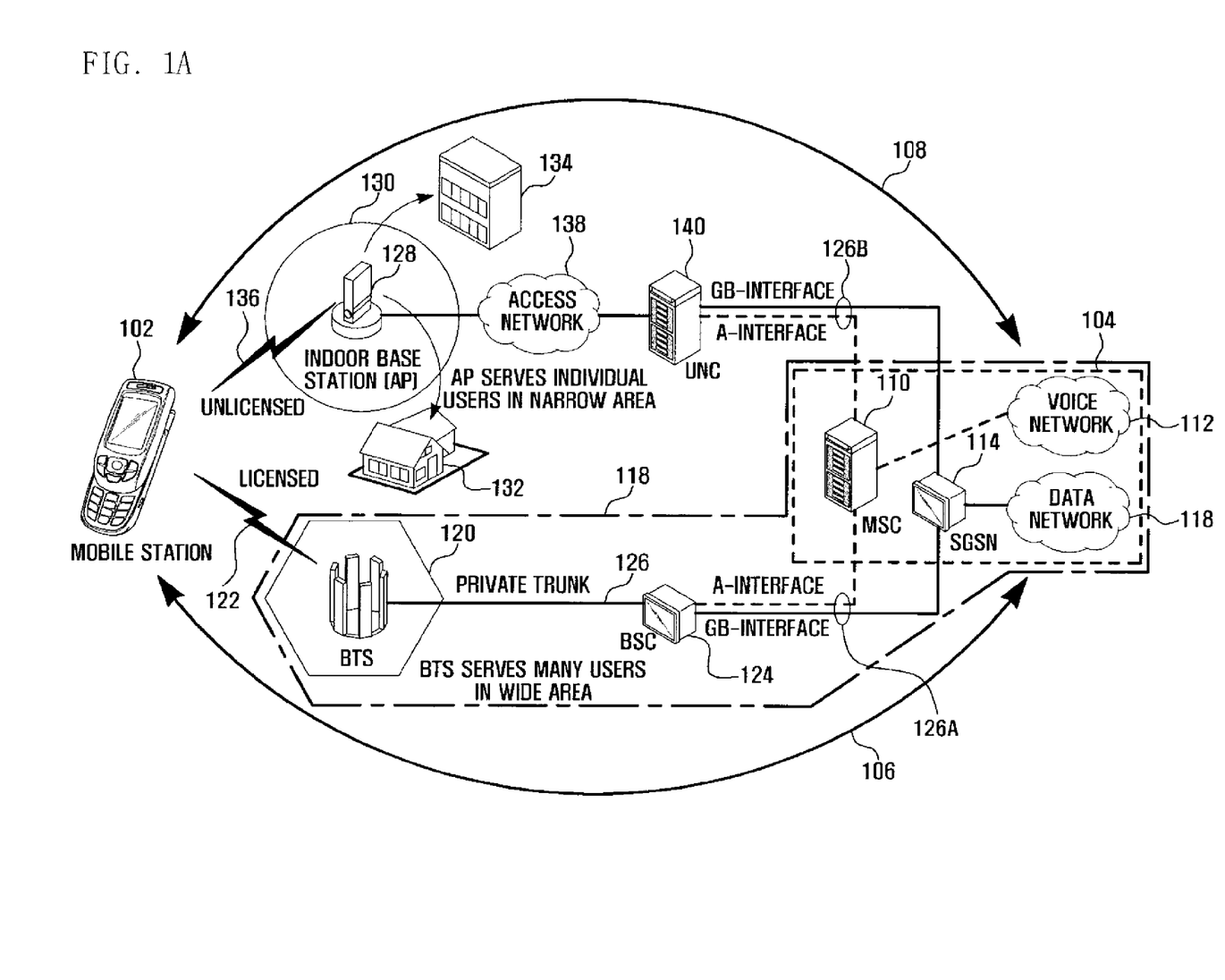
FIG. 1A illustrates a configuration of a UMA system.
Figure 1B:
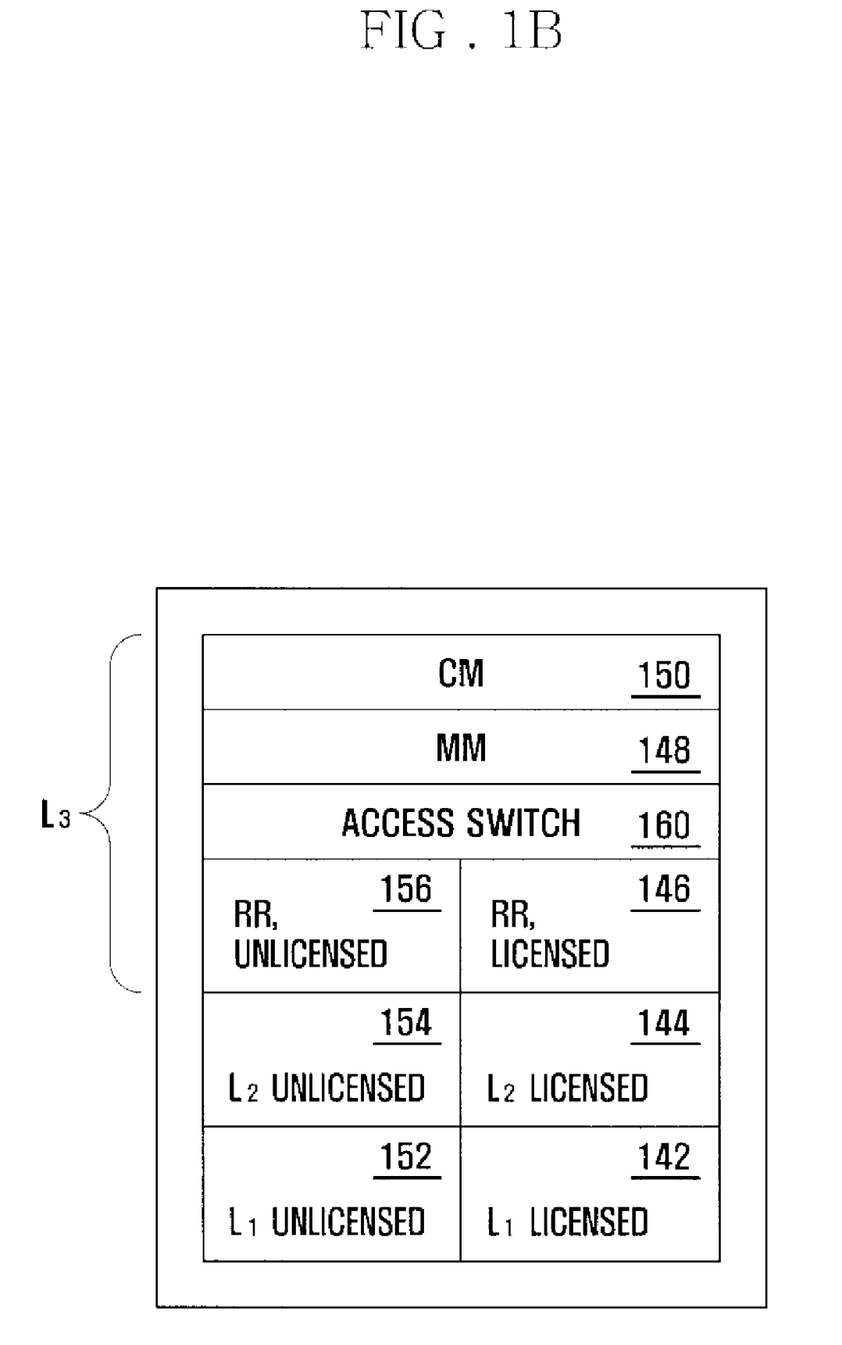
FIG. 1B illustrates protocol layers for communication session management in the UMA system of FIG. 1A.

FIG. 1A illustrates a configuration of a UMA system, and FIG. 1B illustrates protocol layers for communication session management in the UMA system of FIG. 1A.

Referring to FIG. 1A, the user of a mobile station 102 can access a voice/data communication network 104 through a licensed wireless session 106 or unlicensed wireless session 108. The voice/data communication network 104 includes a mobile switching center (MSC) 110 for enabling access to a voice network 112, and a serving GPRS support node (SGSN) 114 for enabling access to a data network 116. The MSC 110 provides the function of a visitor location register (VLR).

In FIG. 1A, the licensed wireless session 106 is facilitated by the infrastructure of a licensed wireless network 118 including the voice/data communication network 104. The licensed wireless network 118 indicates common entities of a GSM cellular network, which includes a plurality of base transceiver stations (BTS) 120 for providing wireless communication services to various mobile stations 102 (only one of them shown) through individual licensed wireless links 122 (for example, each link using a radio frequency within a licensed frequency band). In general, a BTS 120 manages a cell covering a wide service zone. At least one BTS 120 can be managed by a base station controller (BSC) 124, and a BTS 120 is connected to a BSC 124 through a private trunk 126 for communication. A large licensed wireless system, such as a network of a regional or countrywide mobile service provider, may include a plurality of BSCs 124.

A BSC 124 can communicate with the voice/data communication network 104 through a standard BSC interface 126A. For example, the BSC 124 communicates with the MSC 110 through a GSM A-interface for a circuit switched voice service, and also communicates with the SGSN 114 through a GSM Gb-interface for a GPRS packet data service. The voice/data communication network 104 includes protocols for supporting uninterrupted handover from an identified BSC 124 to another BSC (not shown).

In FIG. 1A, the unlicensed wireless session 108 is facilitated by a (wireless) AP 128 including an indoor base station 130. The AP 128 can be located in a fixed structure such as a house 132 or office building 134. The mobile station 102 can be connected to the voice/data communication network 104 through a second data path including an unlicensed wireless channel 136, the AP 128, an access network 138, and a UMA network controller (INC) 140. The UNC 140 communicates with the voice/data communication network 104 through an interface 126B like the interface 126A, and includes a GSM A-interface and Gb-interface.

The indoor base station 130 and a network controller in the house 132 can include software entities for protocol conversion that are stored in memory units and executed on one or more microprocessors (not shown). The UNC 140 can also include software entities for protocol conversion that are stored in a memory unit and executed on one or more microprocessors (not shown).

The unlicensed wireless channel 136 is facilitated by a wireless link making use of a frequency band within the license-free spectrum (for example, 2.4 GHz, 5 GHz, and 11-66 GHz frequency bands). An unlicensed wireless service can provide a communication protocol for hosting an unlicensed wireless channel 136. For example, an unlicensed wireless service can be hosted by a Bluetooth compatible protocol or the Wi-Fi protocol (IEEE 802.11(a, b, or g) standard). In the unlicensed wireless service, the user can receive a high quality service in a service area (i.e., in the range of an AP).

As a result, the user can receive high-speed and high-quality voice and data services at a low cost within the range of an unlicensed AP. The user can also receive a service at a location where a reliable licensed wireless service is not available, thereby extending the service area. In addition, the user can roam outside the range of an AP without service interruption. That is, there is provided uninterrupted handover from the range of an AP to the service area of a licensed wireless network. Outside the range of the AP, services can be automatically provided by the licensed wireless network.

The mobile station 102 can include a microprocessor (not shown) for executing computer program instructions implementing wireless protocols to manage communication sessions, and a memory unit (not shown) for storing the computer program instructions.

As illustrated in FIG. 1B, the mobile station 102 includes a layer 1 (L1) protocol layer 142, layer 2 (L2) protocol layer 144, and layer 3 (L3) signaling protocol layer for licensed wireless services. The L3 signaling protocol layer includes a radio resource (RR) sublayer 146, mobility management (MM) sublayer 148, and a call management (CM) sublayer 150. Software entities in the L1, L2 and L3 protocol layers can be implemented as software modules.

In a licensed wireless service, the L1 protocol layer 142 corresponds to a physical layer for a wireless communication session. The physical layer is the lowest layer of a wireless interface, and transmits bit streams through a physical wireless link. The L2 protocol layer 144 corresponds to a data link layer, which provides signaling functions between the mobile station and base station controller. The RR sublayer 146 is related not only to management of RR sessions during the dedicated mode of the mobile station but also to wireless channel, power control, discontinuous transmission and reception, and handover configuration. The MM sublayer 148 manages the mobility of the user, and performs, for example, location management, security management, and authentication management. The CM sublayer 150 controls establishment of an end-to-end call. Functions of these layers are well known in the wireless communication field.

For unlicensed wireless services, the mobile station 102 includes an unlicensed wireless physical layer 152 (for example, Bluetooth, Wi-Fi and WiMax), an unlicensed wireless link layer 154, and an unlicensed wireless RR sublayer 156. The mobile station 102 further includes an access mode switch 160 for permitting the MM sublayer 148 and CM sublayer 150 to access the unlicensed wireless RR sublayer 156 and unlicensed wireless link layer 154 within the range of an unlicensed wireless AP 128, and for supporting switching between the RR sublayer 146 and unlicensed wireless RR sublayer 156.

The unlicensed wireless RR sublayer 156 and unlicensed wireless link layer 154 can include protocols specific to unlicensed wireless services in addition to protocols for supporting uninterrupted handover between the licensed wireless network and unlicensed wireless network.

In the present embodiment, the GSM/GPRS radio access network is described as a representative example of the licensed wireless service and the present invention is not limited thereto. The UNC 140 connects to a GSM core network through interfaces identical to those of GSM base station subsystem (BSS) network entities. For example, for GSM applications, the interfaces include a GSM A-interface for circuit switched voice services, and a GSM Gb-interface for packet data services (GPRS).

For UMTS applications, the UNC 140 can connect to the UMTS network through a UMTS Iu-cs interface for circuit switched voice services and through a UMTS Iu-ps interface for packet data services. For code division multiple access (CDMA) applications, the UNC 140 can connect to the CDMA network through CDMA A1 and A2 interfaces for circuit switched voice services and through CDMA A10 and A11 interfaces for packet data services. In the present embodiment of a GSM/GPRS application, the UNC 140 corresponds to the GSM BSS of the GSM/GPRS core network.

Referring back to FIG. 1A, transaction control (for example, call processing) is provided through the VLR of the MSC 110 and the SGSN 114. A multi-mode mobile station can access the GSM/GPRS core network through a GSM radio access network when it is outside the service range of an AP 128, or through a UMA network system when it is within the service range of the AP 128.

Hereinabove, an example of a communication system of the present invention is described. Next, an example of handover processing in the communication system is described.

The present embodiment provides a handover processing method for a multi-mode mobile station in the UMA system. For efficient handover processing, neighbor cell information is transmitted from a first wireless network (licensed wireless system) to the mobile station, and the neighbor cell information contains an indicator indicating the presence of a second wireless network (unlicensed wireless system) to which the mobile station can connect.

The first wireless network can be a licensed wireless system such as GSM, GPRS, UMTS or CDMA, as illustrated in FIG. 1A. The second wireless network can be an unlicensed wireless system that supports the UMA or generic access network (GAN) technology such as Wi-Fi, Bluetooth, radio frequency identification (RFID), ultra wideband (UWB), or Zigbee for unlicensed services. For the purpose of description, the terms 'first wireless network' and 'licensed wireless system' are used interchangeably, and the terms 'second wireless network' and 'unlicensed wireless system' are used interchangeably.

In the present embodiment, the mobile station is a multimode mobile station supporting the first wireless network and second wireless network. The mobile station decides whether to handover from the first wireless network to the second wireless network on the basis of neighbor cell information from the first wireless network, and can skip unnecessary handover-related operations. That is, if the neighbor cell information from the first wireless network indicates the absence of an unlicensed wireless system as a handover target, the mobile station does not perform a handover procedure. As a result, unnecessary battery consumption can be reduced.

In detail, for handover to the second wireless network, the mobile station may have to perform a registration procedure including AP scanning, AP registration, IP allocation, tunnel establishment, UNC or GAN controller (GANC) registration. The mobile station can skip these activities for service registration to the unlicensed wireless system. Thus, performance efficiency of the mobile station can be increased and battery consumption can be reduced.

Figure 2:
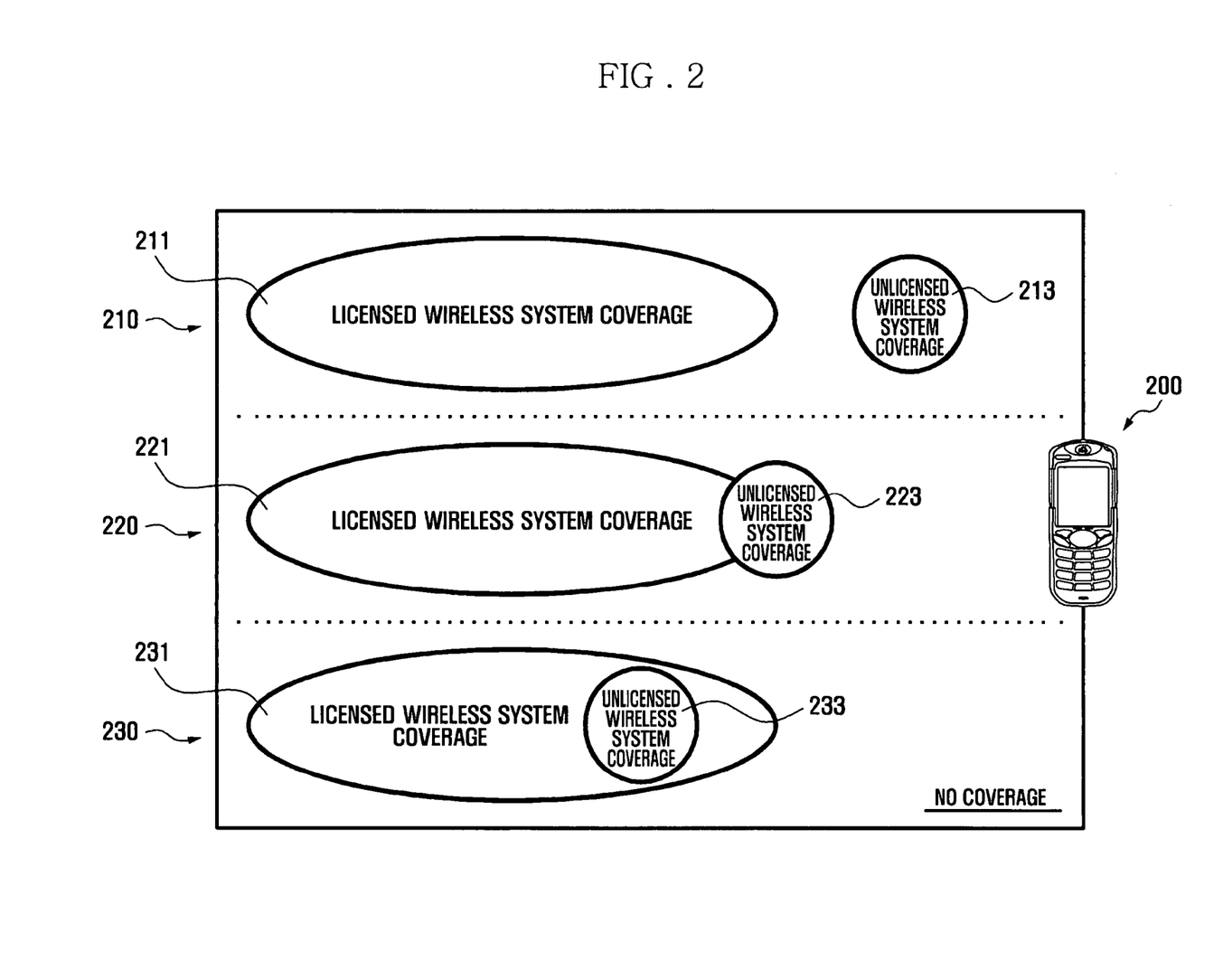
FIG. 2 illustrates occurrences of handover between a licensed wireless system and unlicensed wireless system.

FIG. 2 illustrates occurrences of handover between a licensed wireless system and unlicensed wireless system.

Referring to FIG. 2, a mobile station 200 can operate in different wireless environments. In a first environment 210, the licensed wireless system coverage 211 and unlicensed wireless system coverage 213 are completely independent of each other, and do not overlap with each other. In a second environment 220, the licensed wireless system coverage 221 and unlicensed wireless system coverage 223 overlap in part with each other. In a third environment 230, the unlicensed wireless system coverage 233 is contained in the licensed wireless system coverage 231. The mobile station 200 can try to perform handover in each of these environments.

When the mobile station 200 is first turned on and has no coverage in an idle state, it can perform a scanning procedure to find a licensed or unlicensed wireless system.

If a licensed wireless system is found, the mobile station 200 connects to a service according to a normal mobility management procedure in the licensed wireless system. This action can be performed if no unlicensed wireless system is found, or before completion of a procedure of registration to an unlicensed wireless system.

If an unlicensed wireless system is found, the mobile station 200 creates an unlicensed wireless link to an AP of the unlicensed wireless system to measure signal quality. If the level of a received signal is above a preset threshold, the mobile station 200 performs registration to the found unlicensed wireless system. This action can be performed if no licensed wireless system is found, or if the unlicensed wireless system is found before a licensed wireless system is found.

When the mobile station 200 is in an idle state within the coverage of a licensed wireless system, if an unlicensed wireless system is absent, the mobile station 200 periodically performs a scanning procedure to find an unlicensed wireless system. If an unlicensed wireless system is found, the mobile station 200 can start the above-described procedure of registration to the unlicensed wireless system.

When the mobile station 200 is in an idle state within the coverage of an unlicensed wireless system, if a licensed wireless system is absent, the mobile station 200 can continue to perform a scanning procedure to find a licensed wireless system.

When the mobile station 200 is in an idle state within the coverage of an unlicensed wireless system, if a licensed wireless system is present, the mobile station 200 can continue to perform a cell reselection procedure to the licensed wireless system.

The unlicensed wireless system can be an IEEE 802.11 system. In this case, the mobile station 200 periodically performs an active scanning procedure to find an 802.11 AP. If an AP is found, the AP can be matched with user preferences and profiles stored in a security certificate. Then, the mobile station 200 can be automatically connected to the AP. During a low power sleep mode, the mobile station 200 can be periodically activated to measure signal quality for determining the start time of registration to the unlicensed wireless system.

The unlicensed wireless system can be a Bluetooth system. In this case, the mobile station 200 may have been paired with a Bluetooth AP enabling access to services of the unlicensed wireless system. The mobile station 200 can periodically enter a page scan state, and respond to a paging message from the Bluetooth AP to form a link level connection. While the mobile station 200 is not activated after formation of a link level control channel, it can enter a low power mode (for example, the park mode) to save power. The Bluetooth AP periodically performs polling on the mobile station 200, causing the mobile station 200 to enter an active power mode. This periodic traffic can be used by the mobile station 200 to measure signal quality for determining the start time of registration to the unlicensed wireless system.

As described above, the mobile station can transition from the coverage of a licensed wireless system to the coverage of an unlicensed wireless system.

The mobile station can also transition from the coverage of an unlicensed wireless system to the coverage of a licensed wireless system.

In the following description, the mobile station is assumed to move from the coverage of a first wireless network (licensed wireless system) to the coverage of a second wireless network (unlicensed wireless system). However, the present invention is not limited thereto, and may be applied to various environments, as described previously.

When the mobile station moves to or finds the second wireless network, the mobile station can connect to the second wireless network after performing a procedure of registration to the second wireless network.

However, the mobile station does not know whether a second wireless network is present in a neighbor cell of the serving first wireless network, and unconditionally makes a service request to the second wireless network. Thus, even after completion of registration to the second wireless network, the mobile station may be unable to perform handover to the second wireless network.

That is, the mobile station may be unable to switch to a mode (i.e., UMA mode) for accessing the second wireless network. An example of this problem is described below.

When a UMA-enabled mobile station moves into a room where the level of a Wi-Fi signal is high, the mobile station may continue to use an existing service of a licensed wireless system without interruption using the unlicensed wireless system. However, when the mobile station moves into a room where the Wi-Fi signal level is high, for reception of an uninterrupted service, the mobile station can switch from the mode of GSM EDGE Radio Access Network (GERAN)/ Universal Terrestrial Radio Access Network (UTRAN) to the UMA/GAN mode on the basis of a 'mode selection preference' value.

Here, in the case when the preference mode is set to 'UMA/ GAN preferred', the mobile station unconditionally finds a suitable AP, registers to the AP, makes a service request to the UMA network (UMAN)/GAN, and operates in the UMA/ GAN mode if successful. In the case when the preference mode is set to 'GERAN/UTRAN preferred', the mobile station operates in the UMA/GAN mode after performing the above described procedure if a GERAN/UTRAN is not available.

In the case that the mobile station has the preference mode of 'UMA/GAN preferred' and operates in the GERAN/UT-RAN mode, when the mobile station moves into a location where the Wi-Fi signal level is high, the absolute radio frequency channel number (ARFCN) of the UMA/GAN cell must be registered in a neighbor cell of the current serving GERAN/UTRAN cell in order that the mobile station may receive a continued service from the UMAN/GAN (i.e., to perform handover).

However, as the mobile station does not know whether a UMA/GAN cell is present in a neighbor cell of the current serving GERAN/UTRAN cell, the mobile station unconditionally makes a service request to the UMAN/GAN. Hence, even after completion of service registration to the UMAN/ GAN, the mobile station may be unable to switch to the UMA/GAN mode.

Additionally, when a mobile station having the preference mode of 'GERAN/UTRAN preferred' cannot receive a normal service from the current serving GERAN/UTRAN cell and a suitable neighbor GERAN/UTRAN cell is unavailable, the mobile station makes a service request to the UMAN/ GAN. Because of the same reason, even after completion of service registration to the UMAN/GAN, the mobile station may be unable to switch to the UMA/GAN mode.

As described above, a mobile terminal have to perform a complicated registration procedure including AP scanning, AP registration, IP allocation, secure tunnel creation, and UNC/GAN controller(GANC) registration. This may cause unnecessary battery consumption and processing loads on the mobile station, and also cause unnecessary network resource consumption. In particular, a mobile station having the preference mode of 'UMA/GAN preferred' continuously tries to make a service transition to the UMA/GAN after mode switch failure as long as the Wi-Fi signal level is high and a neighbor DMA/GAN cell is unavailable, raising the above problems.

To solve the above problems, in the present embodiment, an indicator indicating the presence of a UMA/GAN cell is added to the neighbor cell information of a GERAN/UTRAN cell, and a handover algorithm using the indicator is proposed for a multi-mode mobile station supporting GSM/GPRS/ UMTS and UMA/GAN. By skipping an unnecessary procedure of UMAN/GAN service registration, performance of the mobile station can be enhanced, battery consumption can be reduced, and network resource utilization can be heightened.

For the purpose of description, the use of UMA technology is described as a representative example. However, the present invention is not limited to the UMA technology. The multi-mode mobile station of the present invention can be a UMA or CAN-enabled mobile station.

The present invention can be applied to communication systems such as a GSM radio access system, GSM system, CDMA system, UMTS, WCDMA system and a combination of these. These systems are known in the art, and descriptions thereof are omitted.

The mobile station of the present invention is a terminal that can support at least one of UMA and CAN technologies, may be a communication terminal that operates on top of communication protocols related to international mobile telecommunications 2000 (IMT 2000), time division multiple access (TDMA), GSM, CDMA, UMTS, or wideband code division multiple access (WCDMA). The mobile station may also be an information and communication appliance or a multimedia appliance that can communicates with a base station of a mobile communication network and with a WLAN, such as a portable multimedia player (PMP), MP3 player, digital broadcast receiver, personal digital assistant (PDA), smart phone, mobile phone, laptop computer, is and notebook computer.

Figure 3:
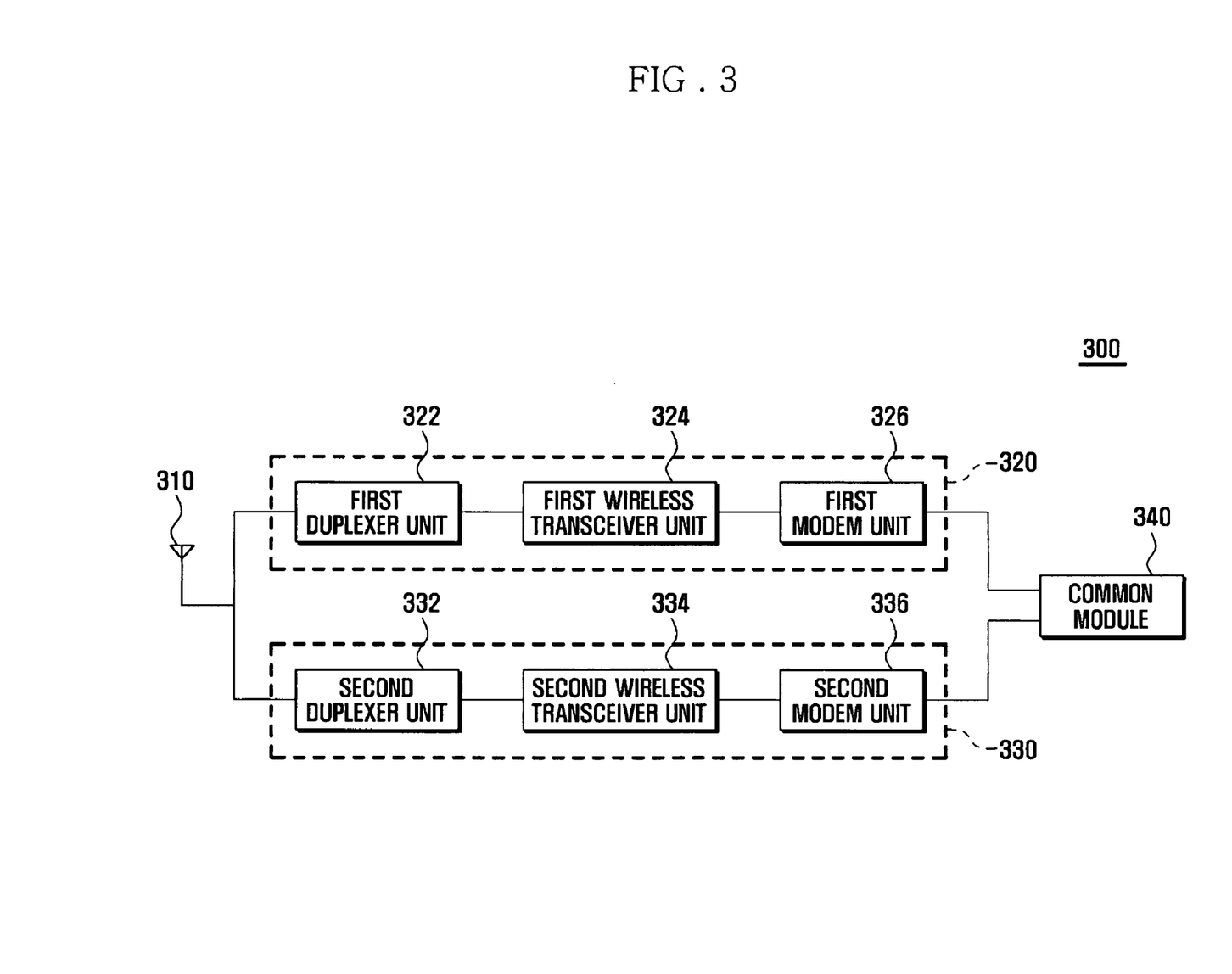
FIG. 3 illustrates a configuration of a multi-mode mobile station according to an embodiment of the present invention.

FIG. 3 illustrates a configuration of a multi-mode mobile station 300 according to an exemplary embodiment of the present invention.

Referring to FIG. 3, the multi-mode mobile station 300 includes an antenna 310, first communication module 320 for communicating with a first wireless network (for licensed services), second communication module 330 for communicating with a second wireless network (for unlicensed services), and common module 340 for controlling the overall operation of the mobile station 300.

The antenna 310 can simultaneously handle frequency bands for communicating with the first wireless network and the second wireless network. Although the antenna 310 is shown as having a single antenna configuration in FIG. 3, it can have a dual antenna configuration for individual wireless networks.

The first communication module 320 can include a duplexer unit acting as a band pass filter for isolating a signal to be transmitted from a received signal, a wireless transceiver unit for transmitting and receiving signals, and a modem unit for processing an air interface protocol together with the first wireless network. The first communication module 320 can be a communication module for receiving a service from a licensed wireless system.

The second communication module 330 can include a duplexer unit acting as a band pass filter for isolating a signal to be transmitted from a received signal, a wireless transceiver unit for transmitting and receiving signals, and a modem unit for processing an air interface protocol together with the second wireless network. The second communication module 330 can be a communication module for receiving a service from an unlicensed wireless system.

The common module 340 controls the first communication module 320 and second communication module 330, and also controls the overall operation of the mobile station 300. The common module 340 includes an application processor for multimedia processing, a memory unit, an input/output unit, and a control unit for controlling signal exchange between these elements.

When a service request is made by a communication system (for example, call reception) or a service request for a communication system is made by the user (for example, call placement), the common module 340 identifies a communication system for processing the service request. The common module 340 controls access to the identified communication system through one of the first communication module 320 and the second communication module 330.

For example, when one of the first wireless network (licensed) and second wireless network (unlicensed) is acquired, the common module 340 controls access to communication services through a corresponding one of the first communication module 320 and second communication module 330. When both of the first wireless network and second wireless network are acquired, the common module 340 controls access to a selected one of the first wireless network and second wireless network through a corresponding one of the first communication module 320 and second communication module 330 according to a preset relative priority.

The common module 340 controls operations of the first communication module 320 and second communication module 330 according to states of communication services from an acquired wireless system. Thereto, the common module 340 can include software modules acting as software entities. For example, the common module 340 can include software entities (related to control of the licensed and unlicensed wireless systems) executed by the control unit. Details of these are described subsequently.

The first communication module 320 provides a first communication interface (licensed communication interface) so that the multi-mode mobile station 300 can communicate with the first wireless network under the control of the common module 340. The second communication module 330 provides a second communication interface (unlicensed communication interface) so that the multi-mode mobile station 300 can communicate with the second wireless network under the control of the common module 340.

As described above, the mobile station 300 of the present embodiment supports at least two communication access modes.

The mobile station 300 can simultaneously activate the first communication module 320 and second communication module 330 upon power-on. Alternatively, the mobile station 300 can activate one of the first communication module 320 and second communication module 330 according to one of a user selection and a preset priority. Here, after activation of one of the first communication module 320 and second communication module 330, if the mobile station 300 cannot establish a connection to the wireless system associated with the one communication module, the mobile station 300 can activate the other communication module and try to access the corresponding wireless system. Thus, the multi-mode mobile station 300 can simultaneously process services from both the first wireless network and the second wireless network.

The multi-mode mobile station 300 can activate, according to a preset system preference, one of the first communication module 320 and second communication module 330, and communicate with the corresponding communication system.

The multi-mode mobile station 300 can adaptively control one or both of the first communication module 320 and second communication module 330 to operate, according to available communication systems. The communication service mode can be set through a menu of Mode Selection Preference illustrated in Table 1, or be set automatically in an adaptive manner.

TABLE 1

Mode Selection Preference

● UMA/GAN preferred
○ GERAN/UTRAN preferred

As illustrated in Table 1, the user of the multi-mode mobile station 300 can set a desired communication service mode through a Mode Selection menu in the user interface.

In Table 1, the 'UMA/GAN preferred' mode indicates that the multi-mode mobile station 300 preferentially accesses an unlicensed one of acquirable wireless systems. The 'GERAN/UTRAN preferred' mode indicates that the multi-mode mobile station 300 preferentially accesses a licensed one of acquirable wireless systems. Although not shown in Table 1, a 'dual mode' can be set so that the multi-mode mobile station 300 simultaneously communicates with supportable ones of acquirable wireless systems.

During operation with Mode Selection Preference set as in Table 1, the mobile station 300 decides whether to perform handover to a corresponding wireless system, using periodically obtained neighbor cell information. That is, the common module 340 controls the first communication module 320 and second communication module 330 according to the setting of Mode Selection Preference, and switches the communication service mode according to conditions of acquired wireless systems. In particular, the common module 340 controls switching between the first communication module 320 and second communication module 330 on the basis of neighbor cell information from a licensed wireless system, and handles handover accordingly. Handover processing is described in detail subsequently.

For the purpose of description, the multi-mode mobile station is described above in connection with specific communication systems. However, the multi-mode mobile station of the present invention is not limited to the above-described communication systems. The multi-mode mobile station is a mobile station that can receive services from at least two communication systems including currently available communication systems and communication systems to be developed and deployed in the future.

The configuration and operation of the multi-mode mobile station of the present invention are described above. Next, according to another embodiment of the present invention, a handover processing method for the multi-mode mobile station is described.

Figure 4:
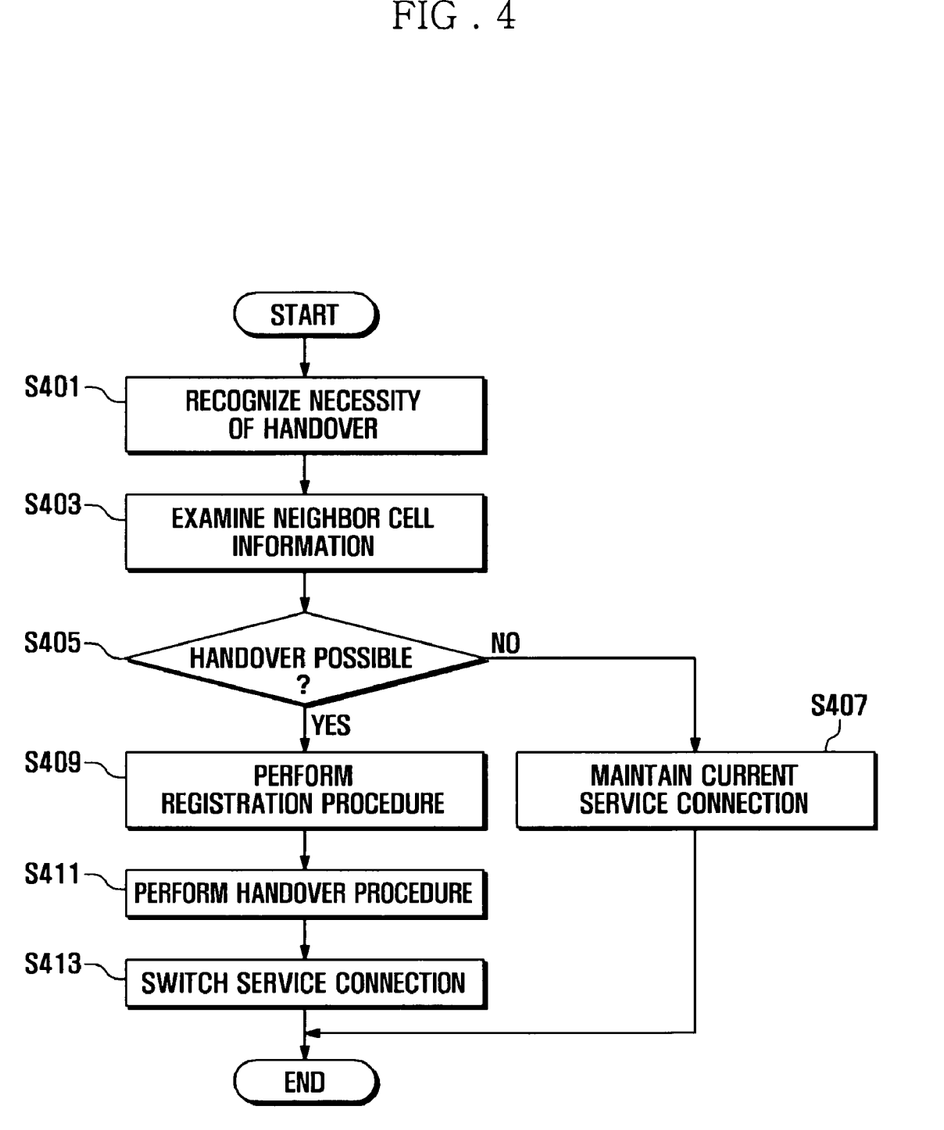
FIG. 4 is a flow chart illustrating a handover processing method according to another embodiment of the present invention.

FIG. 4 is a flow chart illustrating a handover processing method according to another exemplary embodiment of the present invention. FIG. 4 illustrates, as a representative example of handover, the case that the mobile station performs handover from a first wireless network (licensed wireless system) to a second wireless network (unlicensed wireless system).

Referring to FIG. 4, when the mobile station recognizes the necessity of handover (S401), it examines neighbor cell information from the first wireless network (S403). The neighbor cell information can be obtained from system information messages periodically transmitted by the first wireless network. That is, the first wireless network can broadcast system information messages containing neighbor cell information at regular intervals. In addition, an indicator of a cell of an unlicensed wireless system (for example, an indicator of a UMA/GAN cell) can be included in the neighbor cell information.

The mobile station determines the possibility of handover using the neighbor cell information (S405). For example, the mobile station can check whether the neighbor cell information indicates the presence of a second wireless network as a handover target.

If a second wireless network as a handover target is not present, the mobile station maintains the current service connection (8407). That is, the mobile station maintains access to the first wireless network, which currently serves the mobile station.

If a second wireless network as a handover target is present, the mobile station performs a registration procedure (including AP scanning) together with the second wireless network (S409).

After registration to the second wireless network, the mobile station performs a procedure of handover to the second wireless network (S411). After handover, the mobile station continues to receive the ongoing service from the second wireless network without interruption (S413).

Figure 5:
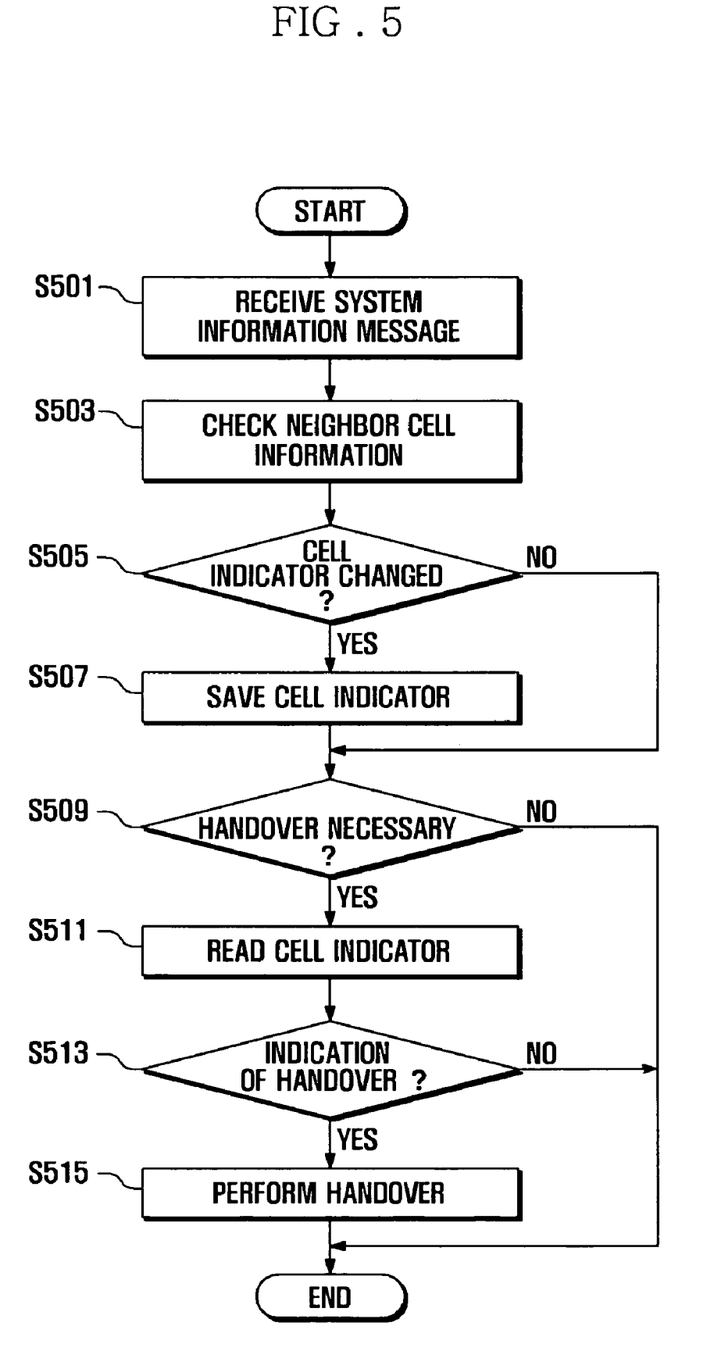
FIG. 5 is a flow chart illustrating a handover processing method according to another embodiment of the present invention.

FIG. 5 is a flow chart illustrating a handover processing method according to another exemplary embodiment of the present invention.

The common module of the mobile station can execute the handover algorithm of FIG. 5 whenever it obtains neighbor cell information from a serving first wireless network (licensed wireless system) through the first communication module.

Referring to FIG. 5, the first communication module receives a system information message from the first wireless network, and sends the received system information message to the common module (S501). The common module examines neighbor cell information in the system information message (S503), and checks whether a cell indicator of a second wireless network is changed (S505).

The common module can generate signals to control the first communication module or the second communication module on the basis of the neighbor cell information from the first wireless network. The common module examines a cell indicator of a second wireless network (for example, a UMA/GAN cell indicator) in the neighbor cell information, and generates a control signal accordingly. That is, the common module examines the cell indicator to check whether the cell indicator is changed, and generates a corresponding control signal. As the value of the cell indicator is saved, whether the cell indicator is changed can be determined by comparing the saved old value of the cell indicator with the new value thereof.

If the cell indicator is changed, the common module stores the new cell indicator (S507). That is, the saved old value of the cell indicator is replaced by the new value (cell indicator update).

Thereafter, the common module determines the necessity of handover (S509). The common module determines whether to perform handover, using the value of 'mode selection preference' described in connection with Table 1. For example, in the 'UMAIGAN preferred' mode, the necessity of handover may be checked at registration to the first wireless network. In the 'GERAN/UTRAN preferred' mode, the necessity of handover may be checked when reception of normal services from the serving first wireless network is not available and another first wireless network close to the serving first wireless network is not available either.

If handover is necessary, the common module reads the updated cell indicator (S511) to check whether the cell indicator is an indication of handover (S513).

If the cell indicator is not an indication of handover (for example, the value of the cell indicator is 'false'), the common module skips a registration procedure including AP scanning and the handover processing method ends. In this case, the common module controls the first communication module to maintain the current service connection to the serving first wireless network.

If the cell indicator is an indication of handover (for example, the value of the cell indicator is 'true'), the common module controls the second communication module to perform a registration procedure including AP scanning and to complete handover to the second wireless network (SS15).

As apparent from the above description, the present invention provides a handover processing method and handover processing system that enable a multi-mode mobile station to efficiently perform handover between a licensed wireless system and unlicensed wireless system. The mobile station can skip unnecessary handover-related operations. As a result, performance of the mobile station can be enhanced. Battery consumption can be reduced. Radio resource consumption can also be reduced.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. A method for handover processing in a multi-mode mobile station supporting unlicensed mobile access (UMA), comprising:
   receiving a system information message from a serving licensed wireless system;
   determining whether a cell indicator of an unlicensed wireless system is changed, wherein the cell indicator is contained in neighbor cell information of the system information message and represents the presence of the unlicensed wireless system;
   if the cell indicator is not changed, maintaining an existing connection to the licensed wireless system;
   if the cell indicator is changed, updating a saved old value of the cell indicator with a new value; and
   performing handover on the basis of a current value of the cell indicator.

2. The method of claim 1, wherein whether the cell indicator is changed is determined by comparing the saved old value of the cell indicator with the new value of the cell indicator.

3. The method of claim 2, wherein performing handover is determined according to a preset priority in communication service modes.

4. The method of claim 3, wherein performing handover further comprises:
   checking whether the cell indicator denotes an indication of handover;
   if the cell indicator does not denote an indication of handover, preventing any handover-related operation; and
   if the cell indicator denotes an indication of handover, performing handover to a corresponding unlicensed wireless system.

5. The method of claim 4, wherein performing handover further comprises:
   checking the value of the cell indicator;
   if the value of the cell indicator is 'false', preventing any handover-related operation; and
   if the value of the cell indicator is 'true', performing registration to the unlicensed wireless system, and then performing handover to the unlicensed wireless system.

6. A multi-mode mobile station to support unlicensed mobile access (UMA), comprising:

a first communication module for communicating with a licensed wireless system;

a second communication module for communicating with an unlicensed wireless system; and a common module for examining neighbor cell information received through the first communication module, and handling handover between the licensed wireless system and unlicensed wireless system through operation control of the first communication module and second communication module according to the neighbor cell information, said neighbor cell information including information regarding presence of the unlicensed wireless system, wherein the common module obtains the neighbor cell information from a system information message broadcast by the licensed wireless system, and determines whether to handover according to a current value of a cell indicator of the unlicensed wireless system in the neighbor cell information by comparing a saved old value of the cell indicator with the current value of the cell indicator.

7. The multi-mode mobile station of claim 6, wherein the common module determines whether to handover according to a preset priority in communication service modes.

8. The multi-mode mobile station of claim 7, wherein the common module performs operation control of the first communication module and second communication module according to a state of at least one communication service from at least one acquired wireless system, and comprises at least one software entity for the operation control.

9. The multi-mode mobile station of claim 8, wherein the common module controls communication with a corresponding wireless system through one of the first communication module and second communication module according to a preset preferred communication mode.

10. The multi-mode mobile station of claim 6, further comprising at least one antenna for processing frequency bands used to communicate with the licensed wireless system and unlicensed wireless system.

11. A handover processing system for an unlicensed mobile access (UMA) communication network, comprising:

a licensed wireless system that periodically broadcasts a system information message including a neighbor cell information related to a presence of an unlicensed wireless system; and a mobile station that performs handover to the unlicensed wireless system according; to the neighbor cell information broadcast by the licensed wireless system, wherein the neighbor cell information comprises a cell indicator of the unlicensed wireless system and depending upon the value of the cell indicator the mobile station performs one action selected from the group consisting of prevention of any handover-related operation and handover to the unlicensed wireless system.

* * * * *